United States Patent [19]

Fukuhara

[11] Patent Number: 5,061,885

[45] Date of Patent: Oct. 29, 1991

[54] POWER SCREWDRIVER

[75] Inventor: Kenji Fukuhara, Tokyo, Japan

[73] Assignee: Kayashi Tokei Kogyo Kabushiki Kaisha, Tokyo, Japan

[21] Appl. No.: 557,287

[22] Filed: Jul. 24, 1990

[30] Foreign Application Priority Data

Aug. 15, 1989 [JP] Japan ................................ 1-210439

[51] Int. Cl.[5] ................................ H02P 3/06

[52] U.S. Cl. ................................ 318/434; 318/430; 318/476

[58] Field of Search ............... 318/434, 443, 444, 445, 318/474, 475, 476, 477, 480, 430; 310/47, 50

[56] References Cited

U.S. PATENT DOCUMENTS

| | | | |
|---|---|---|---|
| 4,056,762 | 11/1977 | Schadlich | 318/484 |
| 4,066,942 | 1/1978 | Bardwell et al. | 318/434 |
| 4,463,293 | 7/1984 | Hornung et al. | 318/284 |
| 4,510,424 | 4/1985 | Doniwa | 318/432 |
| 4,906,980 | 3/1990 | Fukuhara | 340/680 |

*Primary Examiner*—Bentsu Ro

*Attorney, Agent, or Firm*—Ronald C. Fish

[57] ABSTRACT

An apparatus detects stoppage of a motor of a power driven screwdriver due to the excess load. After detecting stoppage, power to the motor is increased gradually to a predetermined value to firmly tighten the screw. The time of increase of power is determined at an arbitrary value.

6 Claims, 6 Drawing Sheets

POWER SCREWDRIVER

BACKGROUND OF THE INVENTION

The present invention relates to a screwdriver by an electric motor.

Power screwdrivers are utilized in a field of precision machinery such as assembly of watches.

In screwing with power screwdrivers, the power is increased to strengthen the rotation torque when the driver screw tightens to the point that it cannot rotate anymore. By increasing the power, the screwdriver tries to rotate, and sometimes it rotates a little bit and tightens the screw. The operation is called "MASHIJIME", which means final increased tightening. In "MASHIJIME" the power is gradually increased, which may make the rotation torque of the motor stable and provide a reliable attachment.

Though longer "MASHIJIME" provides more stable torque, in some jobs, shorter assembly time may be needed more than stable torque. Furthermore, "MASHIJIME" time varies depending on the type of screw to be screwed or the production system where the power screwdriver is applied.

The screwdriver occasionally rotates a half revolution or more in the final tightening "MASHIJIME" for several reasons. One reason is that the bit of the driver rotates in the screw head because the bit does not match the head of the screw or because the bit is broken. Such false rotation of the screwdriver causes weak and unreliable fastenings because of the lack of final tightening so that the device so assembled become substandard.

In manual operation, the operator may detect the false rotation of the power screwdriver bit. But today screwdrivers are mostly operated by automatic machines like robots, which makes it difficult to detect false rotation of the screwdriver bit and causes many substandard devices.

An object of the invention is to provide a power screwdriver which can change the final tightening "MASHIJIME" time.

A further object of the invention is to provide a power screwdriver which can detect repetitive occurrence of false rotation of a bit of a screwdriver.

DETAILED DESCRIPTION OF THE PREFERRED EMBODIMENT

Figure 1:
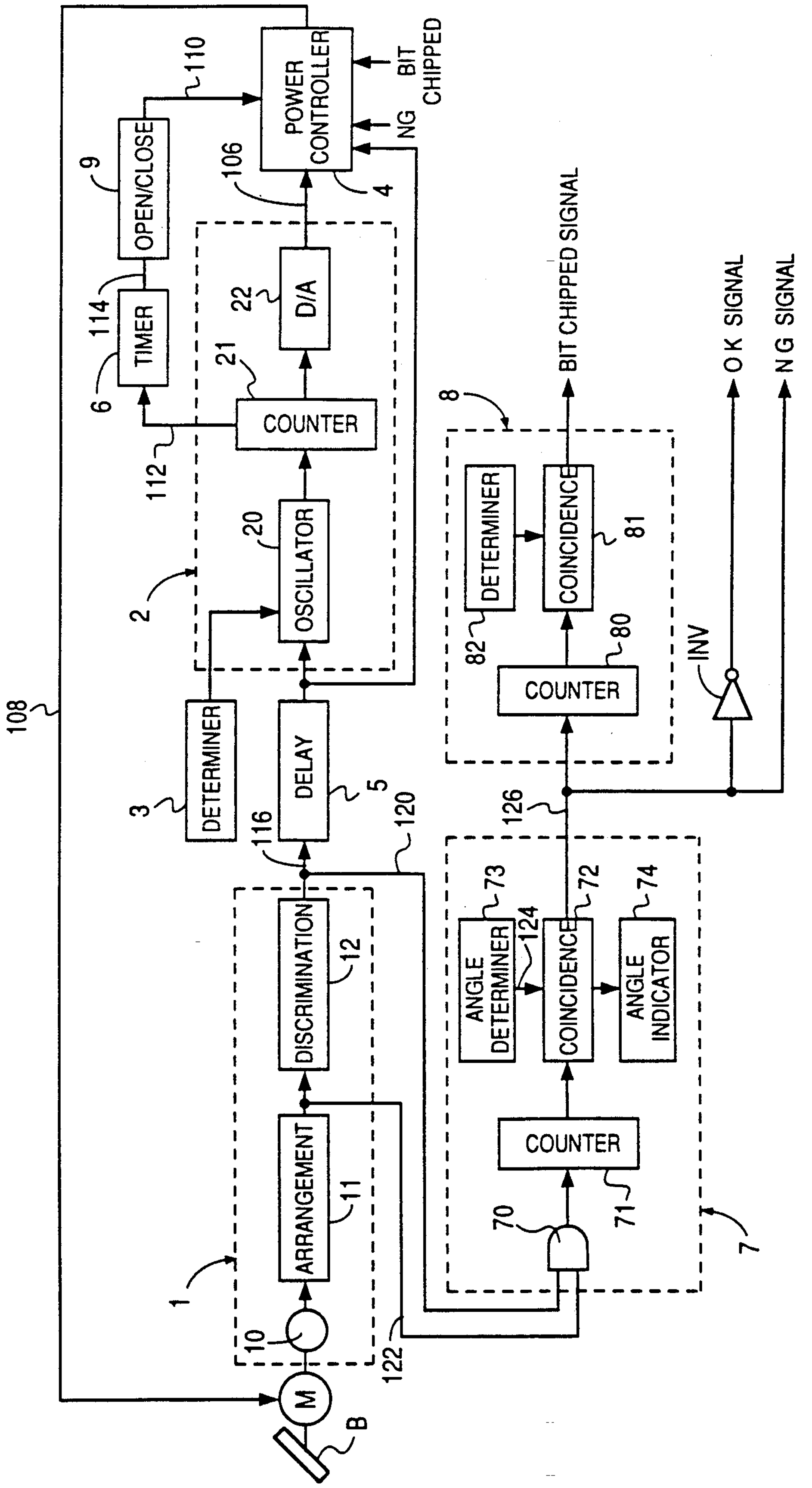
FIG. 1 is a block diagram showing one embodiment of the invention.
Figure 2A:
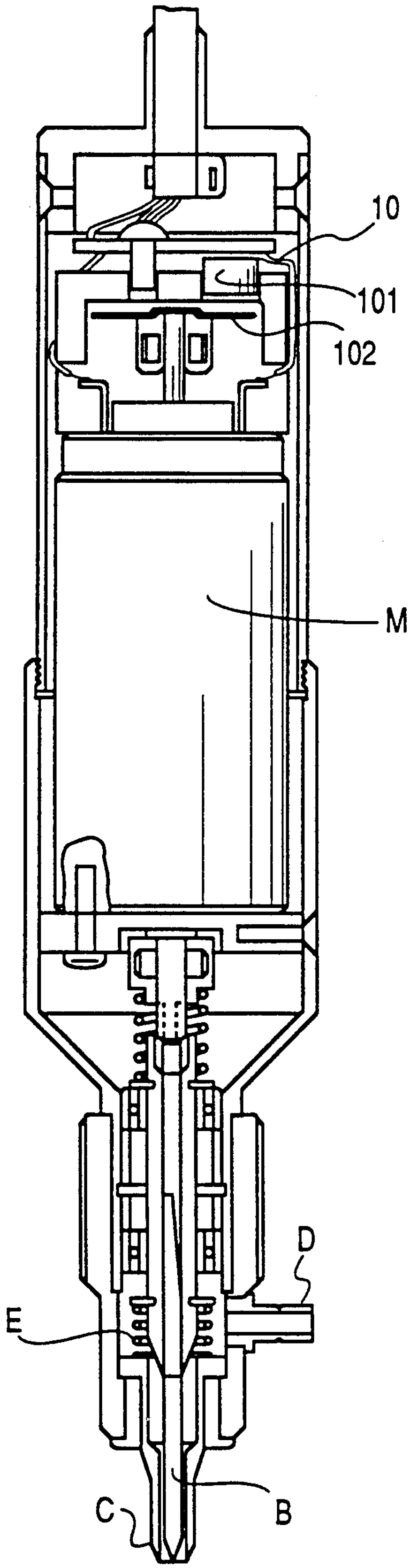
FIGS. 2A and 2B are explanatory drawing showing the mechanical construction of the embodiment.
Figure 2B:
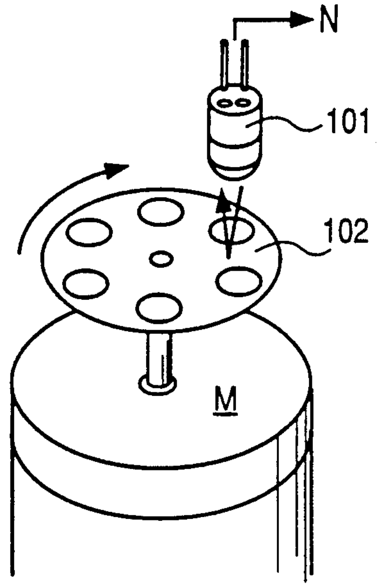

In the embodiment shown in FIGS. 1 and 2, a power screwdriver comprises a motor M and a bit B. The motor M is controlled by a power controller 4. As shown in FIG. 2, the bit B is covered by a top cover C. A suction pipe D is provided at the base of the bit B to suck up a screw through the top cover C. The suction pipe D is connected to a vacuum pump (not shown).

The top cover C is slidably supported by a spring E. The top cover C is withdrawn into the body of the screwdriver by pressing the screwdriver as a screw is screwed into the object.

The motor M is connected to a rotation detector 1, which has a rotation sensor 10 mechanically mounted on the motor M. The rotation sensor 10 includes a reflection photointerrupter 101 and a rotating slit disk 102 having a predetermined number of slits. The reflection photointerrupter 101 illuminates to the rotating slit disk 102 and detects the reflecting light from the non-slit area of the rotating slit disk 102, which represents the rotation of the motor M. Thus the reflection photointerrupter 101 provides the output pulses representing the rotation of the motor M. The output signal from the rotation sensor 10 is delivered to a stop discriminator 12 through a waveform arrangement circuit 11 (signal conditioner) where the signal is arranged in a certain waveform.

Figure 3:
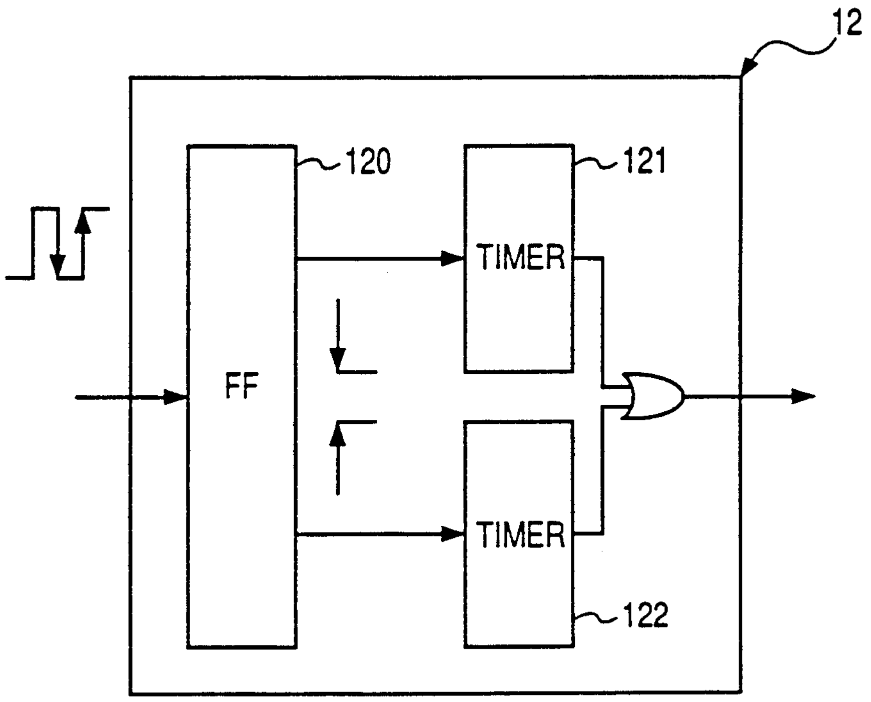
FIG. 3 is a block diagram showing a detail of a stop discriminator.

The stop discriminator 12 determines when the motor M stops by detecting the absence of rotation pulse signals from the waveform arrangement circuit 11 (signal conditioner) for a predetermined period. As shown in FIG. 3, the stop discriminator 12 comprises a flip-flop 120 and timers 121 and 122. When the motor M stops, it is unknown whether or not the rotating slit disk 102 will stop at the exact position where one of the slits is below the reflection photointerrupter 101. Therefore, the flip-flop 120 detects both the up and down pulses and timers 121 and 122, respectively, are used to determine if the pulses have stopped the pulses for the predetermined time regardless of where the rotating slit disk comes to rest.

The stop signal from the stop discriminator 12 is fed to a voltage controller 2 and a power controller 4 through a delay circuit 5. The delay circuit 5 provides a predetermined delay after stopping of the motor M during which torque is still applied by the motor to the bit, to improve the stability of "MASHIJIME".

The voltage controller 2 includes an oscillator 20, a counter 21 and a voltage converter 22. The oscillator 20 receives the instruction signal from a time determiner 3 and generates pulses whose frequency corresponds to the instruction signal. The time determiner 3 is operated to set the frequency of the oscillator 20 by the operator, and the determiner 3 adjusts the time of "MASHIJIME". The pulses from the oscillator 20 are counted at the counter 21, the output of which is converted to a voltage by the voltage converter 22. The voltage converter 22 has a predetermined minimum voltage and a predetermined maximum voltage. The voltage converter 22 outputs voltage signals corresponding to the counter output and in the range from the maximum to the minimum voltage. The counter 21 counts the predetermined number of pulses from the oscillator 20. Therefore counting the predetermined number of pulses takes a longer time when the pulse frequency from the oscillator 20 is low than when the pulse frequency is high. Thus the count time is defined by the frequency set by the time determiner 3. The counter 21 supplies an end signal to a timer 6 when it finishes counting.

Figure 4:
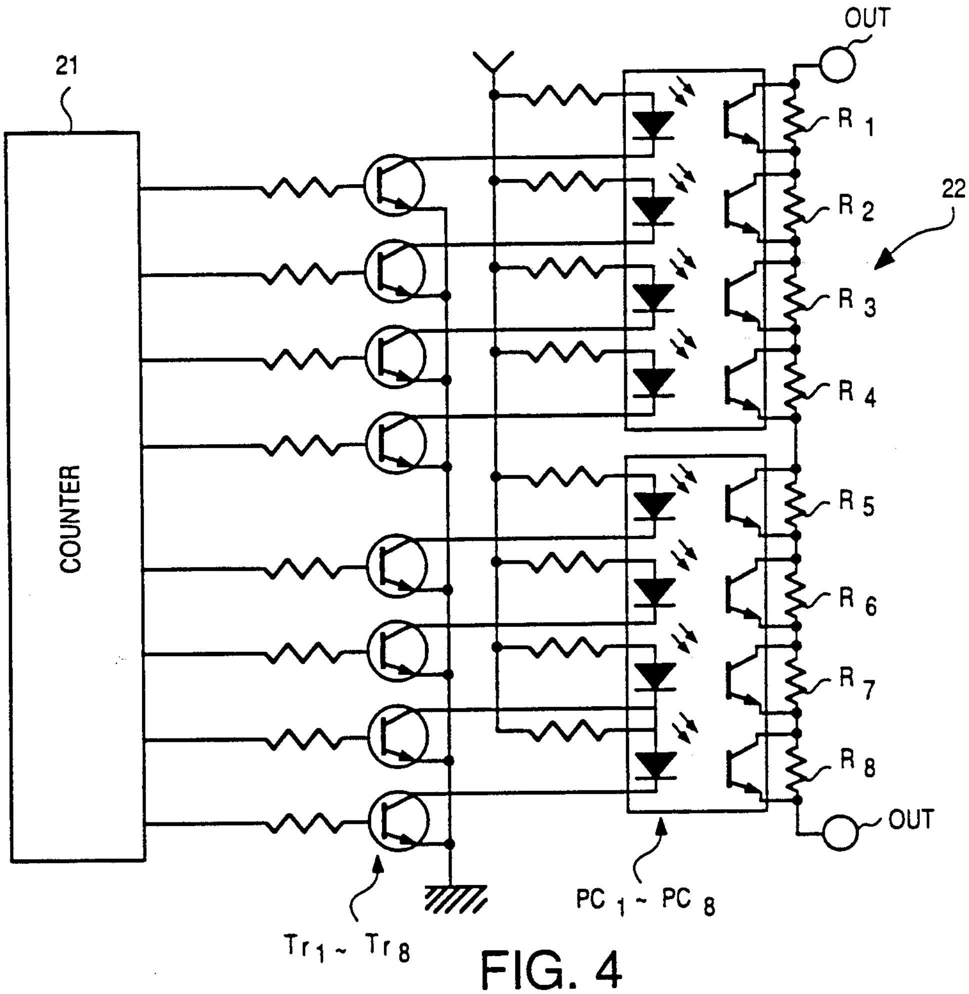
FIG. 4 is a circuit diagram showing a detail of a voltage converter.

The voltage converter 22 in the embodiment shown in FIG. 4 has resistors R1–R8 connected in series and photocouplers PC1–PC8 which are in parallel and bypass the resistors, respectively. The resistors R1-R8 are coupled to the corresponding bits of the output of the counter 21. Each resistor is bypassed by a photocoupler PC coupled to the output of the counter 21. This forms a composite, segmented resistor having a resistance corresponding to the digital value of the output of the counter 21. Thus, at an output terminal OUT, an output voltage corresponding to the output of the counter 21 may be developed.

Transistor Tr1-Tr8 are connected between the counter 21 and photocouplers PC1-PC8. The transistors Tr are individually switched by the individual outputs of the counter 21. When a transistor Tr is "on" the photodiode of the corresponding photocoupler PC emits light thereby shunting the corresponding resistor segment.

The output of the digital-to-analog voltage converter 22 is sent to a power controller 4 via line 106 which gradually increases the voltage supply on line 108 to the M in accordance with the output of the voltage converter 22. The power controller 4 alters the voltage to the motor M between a predetermined minimum voltage at which the motor M stops to a predetermined maximum voltage.

When the counter 21 reaches the maximum count, the increase of voltage from the voltage converter 22 and from the power controller 4 stop. Simultaneously, the timer 6 starts via a signal on line 112 from the counter 21, and, after predetermined interval, the timer 6 sends a signal via line 114 to a power source open/close switch 9 which delivers a disable signal on line 110 to the power controller 4.

The power controller 4 responds to the stop signal by cutting off the power to the motor M. In this embodiment, the power source open/close switch 9 provides a enable/disable signal on line 110 to the power controller 4 after the predetermined interval from the time when the motor M stops and then re-enables the power controller 4 for turning the next screw.

Figure 5:
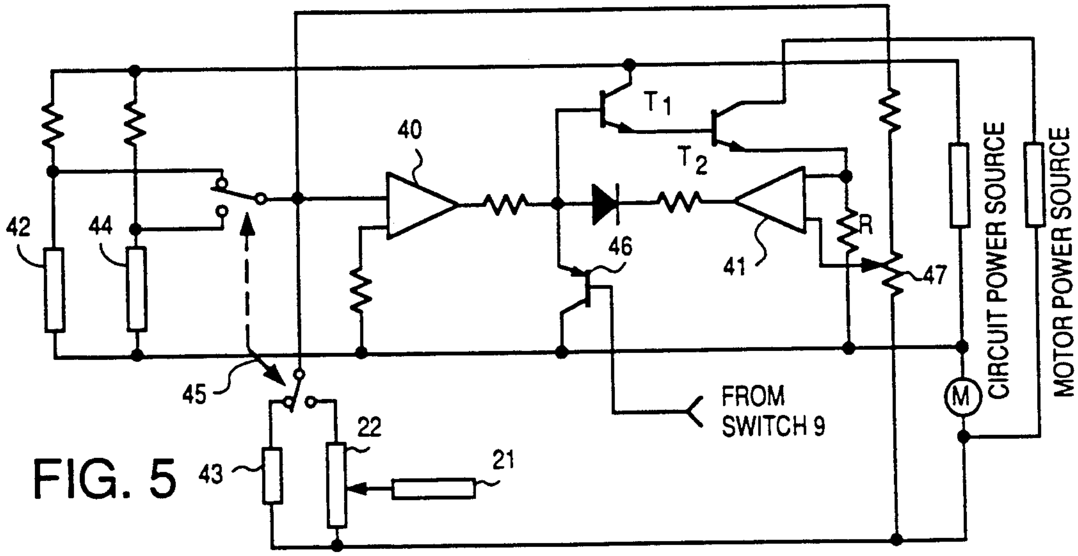
FIG. 5 is a circuit diagram showing a detail of a power controller.

The details of the power controller 4 are shown in FIG. 5.

The rotation speed of the motor M is controlled by controlling a current between the emitter and the collector of a Transistor T2. The Transistor T2 forms a current amplifier with a transistor T1, which is controlled by the output of an operational amplifier 40.

Before starting "MASHIJIME", the initial rotation velocity of the motor M is controlled so as to be a standard value determined by determiner 42 and an initial rotation variable register 43. At the starting of "MASHIJIME", a changeover switch 45 is changed by the signal from the delay circuit 5 and the motor M is controlled by said voltage converter 22 and by a secondary power source standard value determiner 44 to increase stepwise the revolution velocity of the motor M.

An open/close switch 46 in FIG. 5 is switched by the signal from the power source open/close switch 9 in FIG. 1 to switch the output of the operational amplifier 40 on or off. The output of the operational amplifier 40 switches the transistor Tr2 on or off which stops or starts the motor M.

Figure 6:
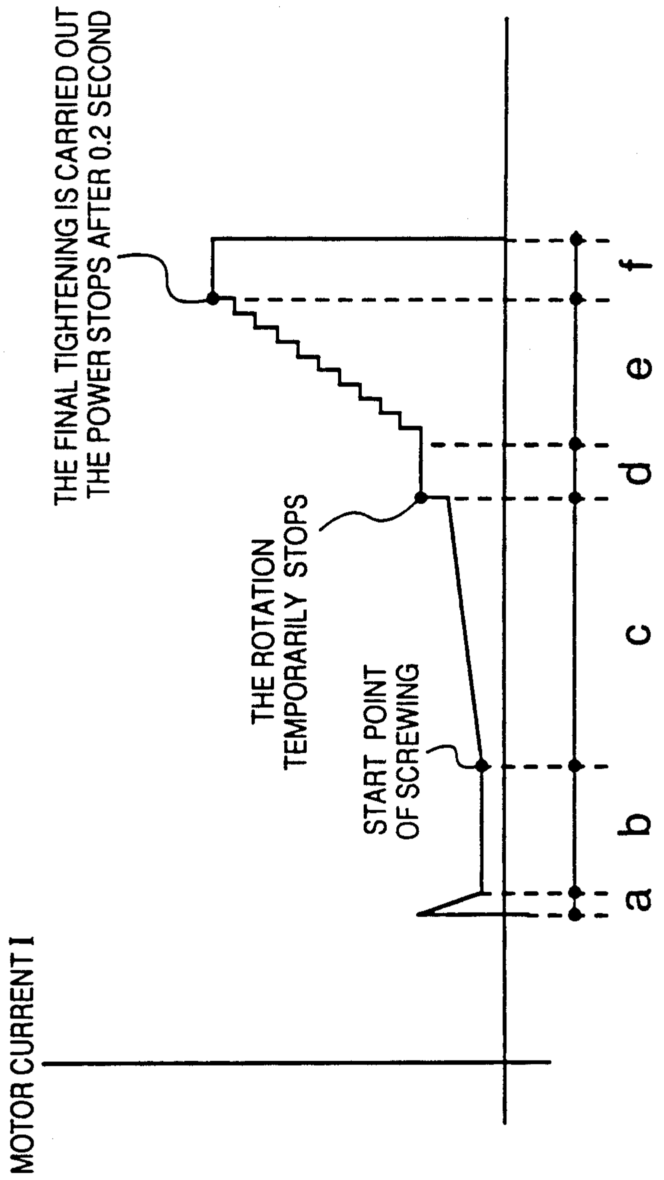
FIG. 6 and 7 are graphs showing the relation between motor current and time illustrating the operation of a power screwdriver according to the teachings of the invention.

The operation of the rotation detector 1, the voltage controller 2, the time determiner 3, the power controller 4, the delay circuit 5 and the timer 6 will be described with reference to FIGS. 6 and 7. As shown in FIG. 6, excess current flows in the motor M at starting, as shown in interval a, and the current soon decreases down to a stationary state, as shown during interval b. The operator starts turning the screw and, as the screw is tightened, the torque increases gradually. The current flowing in the motor M increases depending on the torque increase during interval c. When the screw is almost tightened to a face of the work, the motor M is forced to temporarily stop rotating during interval d.

In the a, b, c and d intervals, the rotation sensor 10 in FIG. 1 delivers the rotation pulses to the stop discriminator 12 through the waveform arrangement circuit 11 for signal conditioning. When the motor M stops, and no pulses are fed to the stop discrimination circuit 12, the circuit 12 sense the stopping of rotation of the motor M and issues the stop signal on line 116 to the delay circuit 5. At the time, the current in the motor M increases and it is held for the rest time defined by the delay circuit 5, i.e., interval d. The screw is firmly tightened to the face of the work in this interval d, which prevents substandard tightening.

The stop signal on line 116 makes the oscillator 20 start generating pulses. The counter 21 counts the pulses and delivers a count value to the digital to analog voltage converter 22. The voltage converter 22 outputs a voltage signal on line 106 which increases in stepwise fashion corresponding to the count number. The signal on line 106 is applied to the power controller 4. The power controller 4 supplies the motor M with a voltage-increasing drive signal thereby increasing the torque of the motor M in stepwise fashion during interval e. The increase of the driving voltage stops when the counter 21 stops counting and the voltage then reaches the predetermined maximum value. The counter 21 provides at this time the count end signal on line 112 to the timer 6, which then starts to count for a certain time (0.2 second in the illustrated embodiment). During the interval f, the maximum voltage is held level. After timeout by the timer 6, the power source open/close switch 9 issues the stop signal on line 110 to the power controller 4, and the motor M stops. At this point, the screwing job is done. At a predetermined time after the motor M stops, 0.6 seconds in the illustrated embodiment, the power source open/close switch 9 provides the return signal on line 110, by which the motor M generates again and repeats the operation described above.

Figure 7:
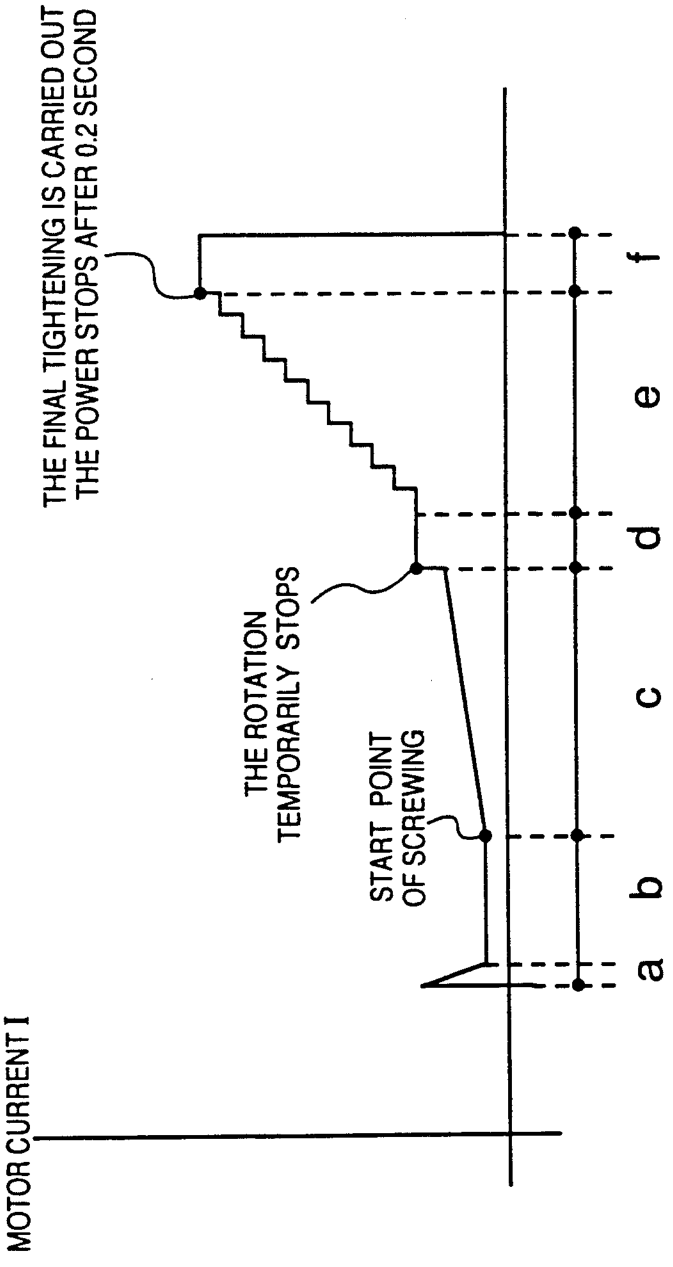

FIG. 7 shows the wave form of the motor current when the oscillator 20 generates a lower frequency than illustrated in FIG. 6. In FIG. 7 the interval e of "MASHIJIME" is longer than in FIG. 6. A longer "MASHIJIME" provides a more securely fastened screw. Contrary to this, the interval e may be shortened from the interval shown in FIG. 6. For example, an almost zero time interval and vertical increase of motor current may be provided. Many other times for interval e may also be used.

A false rotation detector 7 and a false rotation analyzer 8 will be explained with reference to FIG. 1.

The stop signal of the motor M from the stop discrimination circuit 12 is fed to the false rotation detector 7 via line 120. The false rotation detector 7 includes a gate circuit 70 which is opened by the stop signal on line 120 and transmits the rotation pulses of the motor M on a line 122 to a rotation pulse counter 71. The rotation pulse counter 71 counts the rotation pulses and outputs the count value signal to a coincidence detector 72, which compares the rotation pulses representing the actual rotation angle with the predetermined standard rotation angle indicated by an angle determiner 73 by a signal on line 124. The angle determiner 73 may set any 1/n rotation as standard value. The coincidence detector 72 provides a decision of the false rotation occurrence of the bit B when it receives rotation pulses indicating a rotation angle of more than the standard value and delivers an NG signal. Since the motor M rotates only slightly in the final tightening, namely "MASHIJIME", the coincidence detector 72 may decide that a false rotation has occurred if it detects more than a half rotation. In the embodiment shown, a half rotation is selected by the angle determiner 73 as a standard value.

An angle indicator 74 is connected to the rotation pulse counter 71 and coincidence detector 72. The angle indicator 74 indicates the actual rotation angle from the count from rotation pulse counter 71 and the settled rotation angle from the angle determiner 73.

The output from the coincidence detector 72 on line 126 is inverted at an invertor INV and is provided as an OK signal which indicates, when active, that there is no false rotation.

The false rotation output signal from the coincidence detector 72 is also fed to a false rotation analyzer 8. The false rotation analyzer 8 includes a false rotation counter 80, a coincidence detector 81 and a false rotation determiner 82. The false rotation counter 80 counts the number of occurrence of the false rotation which is compared at the coincidence detector 81 with the occurrence number determined by the false rotation determiner 82. The coincidence detector 81 decides that the bit B is chipped if the number counted by the false rotation counter 80 reaches the standard number indicated by the false rotation determiner 82. In such a case the coincidence detector 81 provides a Bit-Chipped signal.

The signals OK, NG and Bit-Chipped may be displayed by an appropriate indicator, and the signals may be utilized as control signals to other equipment. The NG signal and the Bit-Chipped signals can also be supplied to the power controller 4 to stop the motor M.

What is claimed is:

1. A power screwdriver comprising:

a motor;

means for detecting stoppage of the motor due to load in excess of a predetermined value;

means for gradually increasing power to the motor to a predetermined value after detecting said stoppage of the motor, wherein said means for gradually increasing power includes an oscillator having an output, a counter having an output for counting the output of the oscillator and a controller which supplies the power corresponding to the output of the counter; and means for setting a time of increase of a power supply at an arbitrary value, wherein said means for setting includes a means for changing a frequency of the output of the oscillator.

2. A power screwdriver as claimed in claim 1 wherein said controller has resistors connected in series, each of which may be respectively bypassed by the output of the counter, said resistors forming a composite resistance corresponding to the output of the counter.

3. A power screwdriver comprising:

a motor;

means for detecting stoppage of the motor due to load in excess of a predetermined value;

means for gradually increasing power to the motor to a predetermined value after detecting said stoppage of the motor;

means for setting a time of increase of a power supply at an arbitrary value;

means for detecting rotation of a driven bit in excess of a standard rotation when said means for gradually increasing power to said motor increases the power supply;

means for counting a number of detected rotations; and means for delivering an alarm signal if a count from said means for counting reaches a standard value.

4. A power screwdriver as claimed in claim 3 comprising:

means for determining said standard value of the count at an arbitrary value.

5. A power screwdriver as claimed in claim 3 comprising:

means for determining said standard rotation at an arbitrary value.

6. A power screwdriver as claimed in claim 3 comprising:

means for indicating said rotation when said means for gradually increasing power to said motor increases the power supply.

* * * * *

UNITED STATES PATENT AND TRADEMARK OFFICE

CERTIFICATE OF CORRECTION

PATENT NO. : 5,061,885

DATED : October 29, 1991

INVENTOR(S) : Kenji Fukuhara

It is certified that error appears in the above-indentified patent and that said Letters Patent is hereby corrected as shown below:

On title page, item [73] Assignee: delete "Kayashi" and insert --Hayashi--

Signed and Sealed this

Sixteenth Day of November, 1993

Attest:

BRUCE LEHMAN

Attesting Officer

*Commissioner of Patents and Trademarks*

UNITED STATES PATENT AND TRADEMARK OFFICE

CERTIFICATE OF CORRECTION

PATENT NO. : 5,061,885

DATED : October 29, 1991

INVENTOR(S) : Kenji Fukuhara

It is certified that error appears in the above-indentified patent and that said Letters Patent is hereby corrected as shown below:

On the title page: Item [73] "Assignee" , delete "Kayashi" and insert "Hayashi".

Signed and Sealed this

First Day of March, 1994

Attest:

BRUCE LEHMAN

Attesting Officer

*Commissioner of Patents and Trademarks*